United States Patent [19]

Kurtz

[11] Patent Number: 5,604,144
[45] Date of Patent: Feb. 18, 1997

[54] METHOD FOR FABRICATING ACTIVE DEVICES ON A THIN MEMBRANE STRUCTURE USING POROUS SILICON OR POROUS SILICON CARBIDE

[75] Inventor: Anthony D. Kurtz, Teaneck, N.J.

[73] Assignee: Kulite Semiconductor Products, Inc., Leonia, N.J.

[21] Appl. No.: 444,962

[22] Filed: May 19, 1995

[51] Int. Cl.$^6$ .................................................. H01L 21/265
[52] U.S. Cl. ............................ 437/51; 437/7; 437/974; 437/901
[58] Field of Search ................... 437/51, 7, 974, 437/901, 903, 966; 148/DIG. 54, DIG. 148

[56] References Cited

U.S. PATENT DOCUMENTS

| | | | |
|---|---|---|---|
| 4,003,127 | 1/1977 | Jaffe et al. | 437/974 |
| 4,070,230 | 1/1978 | Stein | 437/974 |
| 5,294,559 | 3/1994 | Malhi | 437/62 |

*Primary Examiner*—Trung Dang
*Attorney, Agent, or Firm*—Plevy & Associates

[57] ABSTRACT

A method for fabricating semiconductor device comprises the steps of providing a substrate formed from a semiconductor material of a first conductivity type and converting a selected portion of the substrate to a porous semiconductor material. This partially forms a membrane-like structure of non-porous semiconductor material on the substrate. The porous semiconductor material is then oxidized to form a rigid layer of oxide material under the partially formed membrane-like structure. After forming the porous oxide material one or more integrated circuit elements can be fabricated on the partially formed membrane-like structure without fracturing it because rigid layer of oxide material operates to support it during the fabrication of the integrated circuit elements. Once the integrated circuit elements are fabricated, all or part of the rigid layer of oxide material is removed to complete the membrane-like structure and allow it to deflect in response to a force applied thereto.

22 Claims, 1 Drawing Sheet

METHOD FOR FABRICATING ACTIVE DEVICES ON A THIN MEMBRANE STRUCTURE USING POROUS SILICON OR POROUS SILICON CARBIDE

FIELD OF INVENTION

This invention relates generally to semiconductor wafer processing and more particularly, to a method for manufacturing transducer structures having thin membrane structures with active elements formed thereon using porous silicon or porous silicon carbide.

BACKGROUND OF THE INVENTION

In modern semiconductor wafer processing for the manufacture of transducer structures with integrated electronics, structures are employed that have extremely thin cross-sectional areas that are often designated as membranes. Such structures include diaphragms and cantilever beams such as those employed in pressure transducer or similar semiconductor devices. These extremely thin membrane-like structures are in themselves difficult to fabricate using prior art semiconductor techniques. Moreover, these thin membrane-like structures are generally fabricated after active elements are formed on the wafer.

Furthermore, when semiconductor transducer structures include amplifiers, signal conditioners and like elements, these elements must be formed on the active side of the wafer where the stress sensing elements of the transducer are formed. Ideally, these thin membrane elements should be formed prior to the fabrication of the amplifier elements, the signal conditioning elements, and the sensor elements. However, prior art fabrication techniques generally require the thin membrane-like structures to be fabricated after the other elements are diffused or deposited onto the surfaces of the wafer. This is because the thinning techniques used for fabricating these thin membrane-like structures involve high temperature etching techniques which employ materials such as NaOH or KOH or other conductivity selective etches. These thinning techniques are known to degrade the elements formed on the active side of the membrane structure.

These adverse effects can be substantially avoided if these thin membrane-like structures were fabricated before the formation of the active elements. However, because these membrane-like structures are very fragile, breakage resulting in low yields becomes a major difficulty when active elements are fabricated on these thin membrane-like structures.

It is, therefore, an object of the present invention to provide a method for fabricating thin membrane-like structures before the formation of the active elements which avoids the breakage and low yields associated therewith.

SUMMARY OF THE INVENTION

A method for fabricating semiconductor device comprises the steps of providing a substrate formed from a semiconductor material of a first conductivity type and forming supporting means in a selected area of the substrate located under an area of the substrate which is designated to become a substantially thin membrane-like structure.

The supporting means is formed by converting a selected portion of the substrate to a porous semiconductor material. This partially forms a membrane-like structure of non-porous semiconductor material on the substrate. The porous semiconductor material is then oxidized to a rigid supporting layer of oxide material. After forming the rigid supporting layer of oxide material stress sensing elements can be fabricated on the future membrane-like structure as well as the rest of the surface of the wafer. The rigid supporting layer strengthens the partially formed membrane-like structure during the fabrication of the integrated circuit elements. Once the sensor and integrated circuit elements are fabricated, all or part of the rigid support layer is easily removed so that the membrane-like structure can deflect in response to a force applied thereto.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE INVENTION

Figure 1:
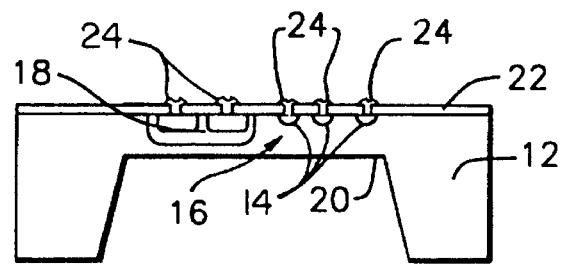
FIG. 1 shows a cross-section of an exemplary semiconductor device fabricated according to the method of the present invention.

FIG. 1 depicts an exemplary embodiment of a semiconductor transducer device 10 fabricated according to the method of the present invention. It should be understood that the semiconductor transducer device 10 is one of many different transducer structures which can be fabricated according to the method of the present invention. Accordingly, the transducer device 10 and is being shown and described only to illustrate the method of the present invention.

The semiconductor transducer device 10 comprises a substrate 12 of semiconducting material such as silicon or silicon carbide. A thin membrane-like element 20 is formed in the substrate 12 and enables that area of the substrate 12 to deflect under applied pressures. In the embodiment shown, the membrane 20 forms a diaphragm. A plurality of piezoresistive sensing elements 14 are fabricated on the active surface of the diaphragm 20. The piezoresistive sensing elements 14 are arranged on the diaphragm 20 as a strain gauge bridge circuit 16. In addition a signal conditioning element 18 consisting of one or more active amplifier elements is formed on the thick i.e. inactive portion of the layer.

A passivation layer 22 substantially covers the entire upper surface of the transducer device 10 except for ohmic contacts 24 which cap each of the elements 14 and 18. Each of the ohmic contacts 24 lies in a window formed in the passivation layer 22, each window being oriented directly over each one of the elements 14 and 18.

As is well known in the art, as the diaphragm 20 deflects under applied pressures, the resistance of the sensing elements 14 vary as a function of the deflection of the diaphragm 20. The signal generated by the sensing elements 14 of the bridge circuit 16 are applied to the signal conditioning element 18 which amplifies the signal generated by bridge circuit 16.

Figure 2:
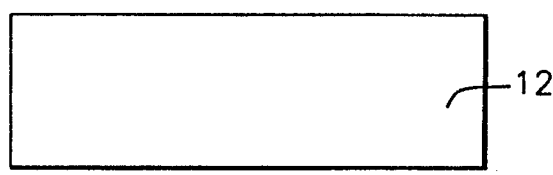
FIG. 2 depicts the structure of the substrate used in forming the semiconductor of FIG. 1.

In the method of the present invention, the semiconductor transducer device 10 shown in FIG. 1 is fabricated by first providing the substrate 12 seen in cross-section in FIG. 2. The substrate 12 is fabricated from any suitable semiconductor material, such as silicon or silicon carbide. Silicon carbide is an excellent semiconductor material for high temperature and high power applications because it has a wide band-gap, high thermal conductivity, high breakdown electric field and high melting point. Therefore, a method is described as this material but it is understood that similar methods may be employed for other semiconductors.

The substrate 12 is preferably monocrystalline in structure and doped to obtain a given conductivity. The wafer may be of any desired geometric configuration in the top plan view, such as rectangular or circular. In accordance with the method of the present invention, if the wafer is monocrystalline silicon carbide then the substrate 12 is doped with an N conductivity type impurity. Typically, the substrate 12 has a doping level $N_d$ of approximately $3 \times 10^{18}$ohm/cm$^3$ and a thickness of approximately 125 um. It should be appreciated that the substrate might also be p-type as desired, and that the processing of an n-type substrate is described for illustrative purposes only.

Figure 3:
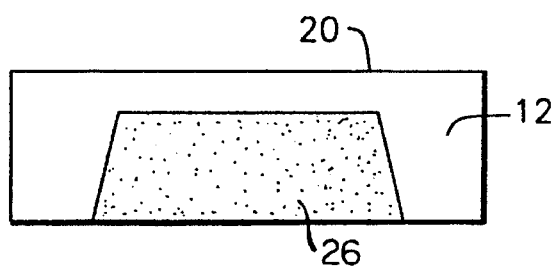
FIG. 3 depicts the structure of FIG. 2 after converting a selected portion of the semiconductor material to porous material.

The diaphragm 20 is then partially formed in the n-type silicon carbide substrate 12 of FIG. 2 by making a selected portion 26 of the substrate immediately below the area where the diaphragm 20 is to be formed porous as shown in FIG. 3. Techniques for forming porous silicon carbide are described in the earlier described U.S. Pat. No. 5,298,767 entitled POROUS SILICON CARBIDE (SIC) SEMICONDUCTOR DEVICE, the disclosure of which is incorporated herein by reference. In accordance with the techniques disclosed in U.S. Pat. No. 5,298,767 porous silicon carbide (and also silicon) is obtained by making the silicon carbide substrate 12 the anode of an electrochemical cell that includes an electrolyte wherein the electrolyte is generally a concentrated hydrofluoric acid solution.

The substrate 12 is electrochemically photoanodized so that the selected portion 26 of the n-type silicon carbide substrate 12 becomes porous, thereby leaving a thin non-porous segment of the substrate 12 which will eventually become the diaphragm 20.

Photoanodization is accomplished by coating the diaphragm side of the substrate with a layer of aluminum (not shown) to provide a low resistance electrical contact. The entire substrate 12, except for the exposed lower surface 28, together with a copper strip for electrical connection, is encapsulated in a suitable encapsulant such as black wax. The encapsulated substrate 12 is placed in the electrochemical cell (not shown). The substrate 12 acts as the working electrode and is biased with respect to a saturated calomel electrode at a suitable potential for the n-type layer to photo-corrode.

Ultraviolet (UV) light illuminates the exposed lower surface 28 of the substrate 12. The depth of the porous portion 26 of the substrate 12 and its structure is determined by the anodization time, the UV light intensity, the applied potential, the pH, and the doping levels of the crystals. Because the anodic current increases with potential and becomes insensitive to illumination at higher potentials, the anode potential for n-type silicon is preferably between 0 and 2 $V_{sce}$ (sce=saturated calomel electrode). The wavelength of light $\lambda$ which is used to photo-anodize the portion 26 of the substrate 12 which will become porous is selected so that the absorption depth $1/\alpha$ of the light in silicon carbide is roughly equal to the thickness $d_1$ of the porous portion 26, as shown in FIG. 3.

Alternatively, the depth of the porous portion 26 of the substrate 12 can be controlled by either diffusing or depositing a p-type etch-stop layer in or on the upper surface 30 of the substrate 12. As is well known, the photo-corrosion of the n-type material will cease when the p-type etch-stop layer is reached.

Figure 4:
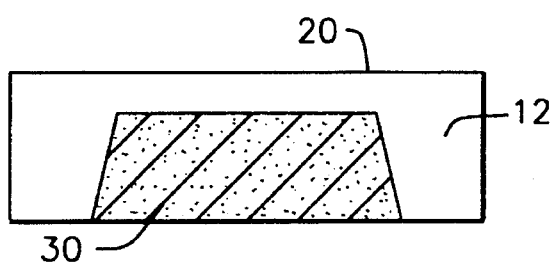
FIG. 4 depicts the structure of FIG. 3 after converting the porous material to a rigid supporting layer of oxide.
Figure 5:
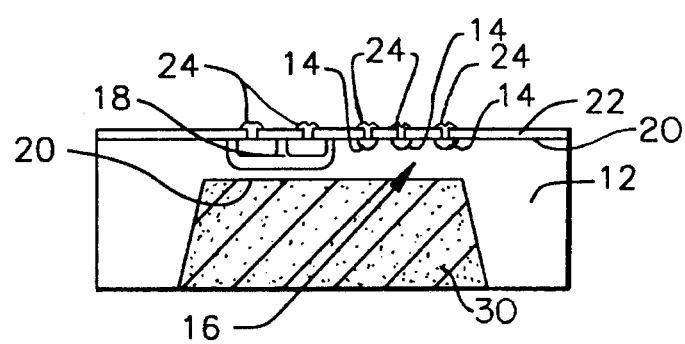
FIG. 5 depicts the structure of FIG. 4 after the active elements of the device have been completed and before the rigid supporting layer of oxide has been removed.

In either case, after the porous portion 26 has been formed it is oxidized using any well known technique such as thermal oxidation. During the oxidation, the porous portion 26 of the silicon carbide is converted to a rigid support layer 30 of oxide material as shown in FIG. 4. The rigid support layer 30 strengthens the entire substrate 12 and enables the wafer to be treated in a conventional manner to fabricate the remaining elements of the device including the piezoresistive strain gauge 16 and the signal conditioning elements 18 described above. This results in higher yields due to substantial reductions in breakage. Moreover, the adverse effects of using high temperature etching materials such as NaOH or KOH to form the diaphragm structure after the active elements have been fabricated on the substrate as in prior art techniques, are eliminated. It is of course obvious that any other semiconductor such as silicon could be used.

Accordingly, once the oxide support layer 30 is formed, the piezoresistive strain gauge 16, the signal conditioning elements 18 and the ohmic contacts and any other components of the device are fabricated on the partially formed diaphragm 20 and the inactive portions of the substrate using conventional techniques which needn't be described here.

After the entire device is fabricated, the diaphragm 20 of the device 10 is completed and made operative by removing all or part of the rigid support oxide layer 30. In this final step of the process, the oxide support layer 30 is easily removed by wet etching in a relatively harmless etchant such as NH$_4$F hydroflouride or like etchant. The completed device 10 can be seen by referring again to FIG. 1.

It should be understood that the embodiment described herein is merely exemplary and that a person skilled in the art may make many variations and modifications to the embodiment utilizing functionally equivalent elements to those described herein. For instance, the method of the present invention can be used to fabricate active elements on other semiconductor transducer thin membrane-like structures such as cantilever beams and the like.

Any and all such variations or modifications as well as others which may become apparent to those skilled in the art, are intended to be included within the scope of the invention as defined by the appended claims.

I claim:

1. A method for fabricating a semiconductor device, comprising the steps of:

providing a substrate formed from a semiconductor material of a first conductivity type;

forming supporting means in a selected area of said substrate located under an area of said substrate which is designed to become a substantially thin membrane structure, said forming resulting in the partial formation of said membrane structure;

fabricating sensor elements on said partially formed membrane structure, whereby said selected portion supports said membrane structure during the fabrication of said sensor elements; and fabricating integrated circuit elements on said substrate not within said membrane area.

2. The method according to claim 1, wherein said step of forming supporting means includes converting said selected area of said substrate to a porous semiconductor material thereby partially creating said membrane structure in the unconverted portion of said substrate, said partially formed membrane structure being substantially non-porous.

3. The method according to claim 1, wherein said semiconductor material comprises monocrystalline semiconductor material.

4. The method according to claim 3, wherein said monocrystalline semiconductor material comprises silicon carbide.

5. The method according to claim 3, wherein said monocrystalline semiconductor material comprises silicon.

6. The method according to claim 2, wherein said step of converting comprises electrochemically photoanodizing said selected area of said substrate for a given time.

7. The method according to claim 6, wherein said step of electrochemically photoanodizing said selected area comprises the steps of:

providing an electrochemical cell having an electrolytic solution therein;

attaching said substrate to said electrochemical cell so that said substrate operates as a working electrode;

biasing said substrate with respect to a second electrode at a given potential which causes said semiconductor material to photo-corrode; and illuminating a surface of said selected area of said substrate with an ultraviolet light of a given intensity to convert said selected area to said porous semiconducting material.

8. The method according to claim 7, wherein said electrolytic solution comprises a hydrofluoric acid solution.

9. The method according to claim 7, wherein said selected area of porous semiconducting material extends a given depth into said substrate.

10. The method according to claim 9, wherein said given depth is controlled by adjusting one of said given time of photoanodizing, said given potential, and said given intensity.

11. The method according to claim 9, wherein said given depth is controlled by an etch stop layer associated with said substrate.

12. The method according to claim 11, wherein said etch stop layer is provided by diffusing an impurity material into said substrate, said impurity material being of a second conductivity type which is opposite to said first conductivity type of said substrate.

13. The method according to claim 11, wherein said etch stop layer is provided by depositing an etch stop layer on said substrate, said etch stop layer being of a second conductivity type which is opposite to said first conductivity type of said substrate.

14. The method according to claim 2, further comprising the step of oxidizing said porous semiconductor material to form a rigid support structure of oxide material under said partially formed membrane structure after said step of converting.

15. The method according to claim 14, further comprising the step of removing said at least a portion of said rigid support structure of said oxide material to complete said membrane structure, whereby said completed membrane structure can deflect in response to a force applied thereto.

16. A method for forming integrated circuit elements on a non-porous membrane structure partially formed in a substrate of semiconductor material, comprising the steps of:

forming supporting means in a selected area of said substrate located under an area of said substrate which is designated to become said partially formed thin membrane structure; and fabricating said integrated circuit elements on said partially formed membrane structure, whereby said selected area supports said partially formed membrane structure during the fabrication of said integrated circuit elements.

17. The method according to claim 16, wherein said step of forming supporting means includes converting said selected area of said substrate to a porous semiconductor material thereby creating said partially formed membrane structure in the uncovered portion of said substrate, said partially formed membrane structure being substantially non-porous.

18. The method according to claim 16, wherein said integrated circuit elements comprise a signal conditioning element.

19. The method according to claim 16, wherein said integrated circuit elements comprise an amplifier element.

20. The method according to claim 16, wherein said integrated circuit elements comprise a strain gauge bridge network.

21. The method according to claim 17, further comprising the step of oxidizing said porous semiconductor material to a rigid support of oxide material after said step of converting.

22. The method according to claim 21, further comprising the step of removing at least a portion of said rigid support of oxide material to complete the membrane structure, whereby said completed membrane structure can deflect in response to a force applied thereto.

* * * * *